(12) United States Patent
Schillak

(10) Patent No.: US 6,543,851 B2
(45) Date of Patent: Apr. 8, 2003

(54) ADJUSTMENT MECHANISM FOR AN AUTOMOBILE SEAT, PARTICULARLY AN INCLINE ADJUSTMENT MECHANISM FOR THE SEAT BACK

(75) Inventor: Christian Schillak, Stadthagen (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 09/883,906

(22) Filed: Jun. 18, 2001

(65) Prior Publication Data

US 2002/0043854 A1 Apr. 18, 2002

(30) Foreign Application Priority Data

Jul. 11, 2000 (DE) .......................................... 100 33 666

(51) Int. Cl.⁷ .............................. B60N 2/22; B60N 2/235
(52) U.S. Cl. ......................... 297/367; 297/369; 297/373
(58) Field of Search ................................. 297/367, 369, 297/373

(56) References Cited

U.S. PATENT DOCUMENTS 5,755,491 A * 5/1998 Baloche et al. ......... 297/367 X
6,318,806 B1 * 11/2001 Levert et al. ................ 297/367

FOREIGN PATENT DOCUMENTS

DE           3013304           11/1983

* cited by examiner

Primary Examiner—Peter M. Cuomo
Assistant Examiner—Rodney B. White
(74) Attorney, Agent, or Firm—Bourque & Associates, P.A.

(57) ABSTRACT

An adjusting mechanism for a seat includes two mechanism parts that form parts of a staggered transmission. An eccentric cam consists of an eccentric segment and two wedge segments completing this eccentric segment. The wedge segments are arranged one above the other in a radial direction, and their thicknesses increase in an opposite direction to each other. They are so tensioned by a common spring that they form an extended eccentric area under pre-tension from the spring, and are pressed against each other during rotation in such a manner that the eccentric area becomes smaller and thus the tension of the intermeshing toothed areas is reduced.

8 Claims, 4 Drawing Sheets

ADJUSTMENT MECHANISM FOR AN AUTOMOBILE SEAT, PARTICULARLY AN INCLINE ADJUSTMENT MECHANISM FOR THE SEAT BACK

FIELD OF THE INVENTION

The invention relates to an adjustment mechanism for an automobile seat back.

BACKGROUND OF THE INVENTION

In a known adjustment mechanism of the prior art as described in DE 30 13 304 C2, part of the wedge segments that form an eccentric cam and are tapered in opposite rotational directions are positioned on a bearing surface concentric to the axis of rotation. A pressure spring stretched between the broad frontal surfaces of the two wedge segments forces the wedge segments in opposing directions with the result that the eccentricity increases because of the spring's effect.

A disadvantage to this known solution is that the length of the wedge segments, i.e., the angle formed by the effective supporting surfaces, is restricted. This restriction is essential to the system. Too great an effective length has the result that the front wedge segment in the direction of rotation does not adequately release the teeth as desired during actuation, but rather presses them together. In practice, the inner contact surface of both wedge segments is therefore relatively short. A relatively short contact surface leads to faster wear because the wedge segment may tip along its supporting surface.

SUMMARY OF THE INVENTION

Based on this state of the art, the present invention features an adjustment mechanism of the type known so that it is formed to be as resistant to wear as possible and to operate silently.

These goals are achieved by the present invention wherein the positioning of the wedge segments in a radial direction with one above the other and with opposite orientation allows the option of selecting an effective length of the wedge segments to be longer than that used in the state of the art, thus forming an articulated mechanism that is more resistant to wear. Because of the comparatively large potential wedge length, it is even possible not to use the entire wedge length, but rather only to provide supporting surfaces at the two ends, leaving the central area free. This promotes silence during operation and reduces manufacturing costs.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The adjusting mechanism shown and described herein is a typical incline adjusting mechanism for an automobile seat back, although the present invention may be used in other applications. The adjusting mechanism includes a fixed mechanism part 1 that is arranged in the area of the seat (not shown), and a mechanism part 2 that is adjusted by rotation and is connected to the seat back (also not shown).

Figure 4:
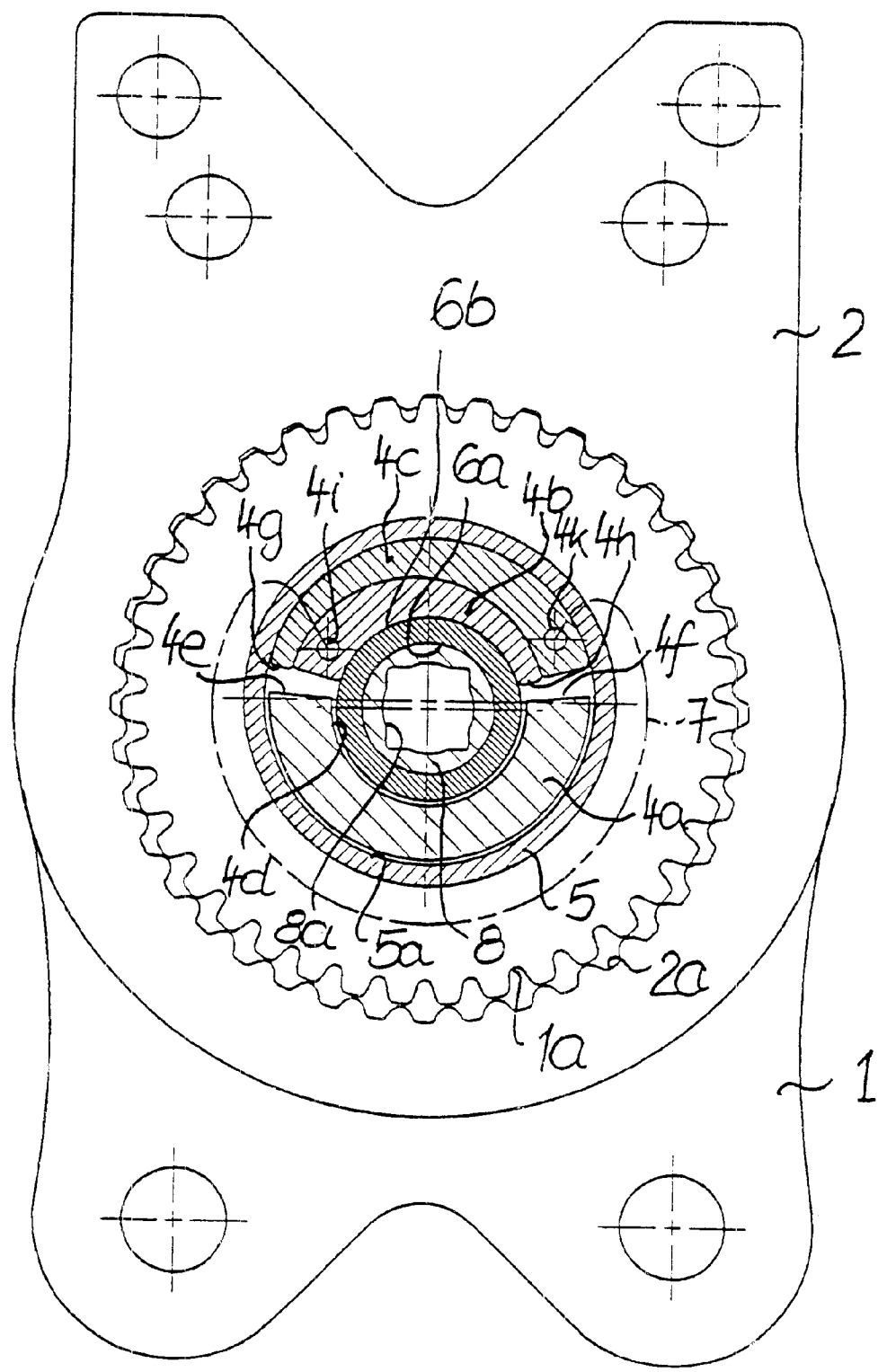
FIG. 4 is a cross-sectional view along plane IV—IV of FIG. 3

The fixed mechanism part 1 includes a toothed region 1a, FIG. 4. This toothed region 1a is shaped to surround and grip a toothed region 2a of the movable mechanism part 2. The toothed regions 1a and 2a form the parts of a staggered transmission.

Figure 1:
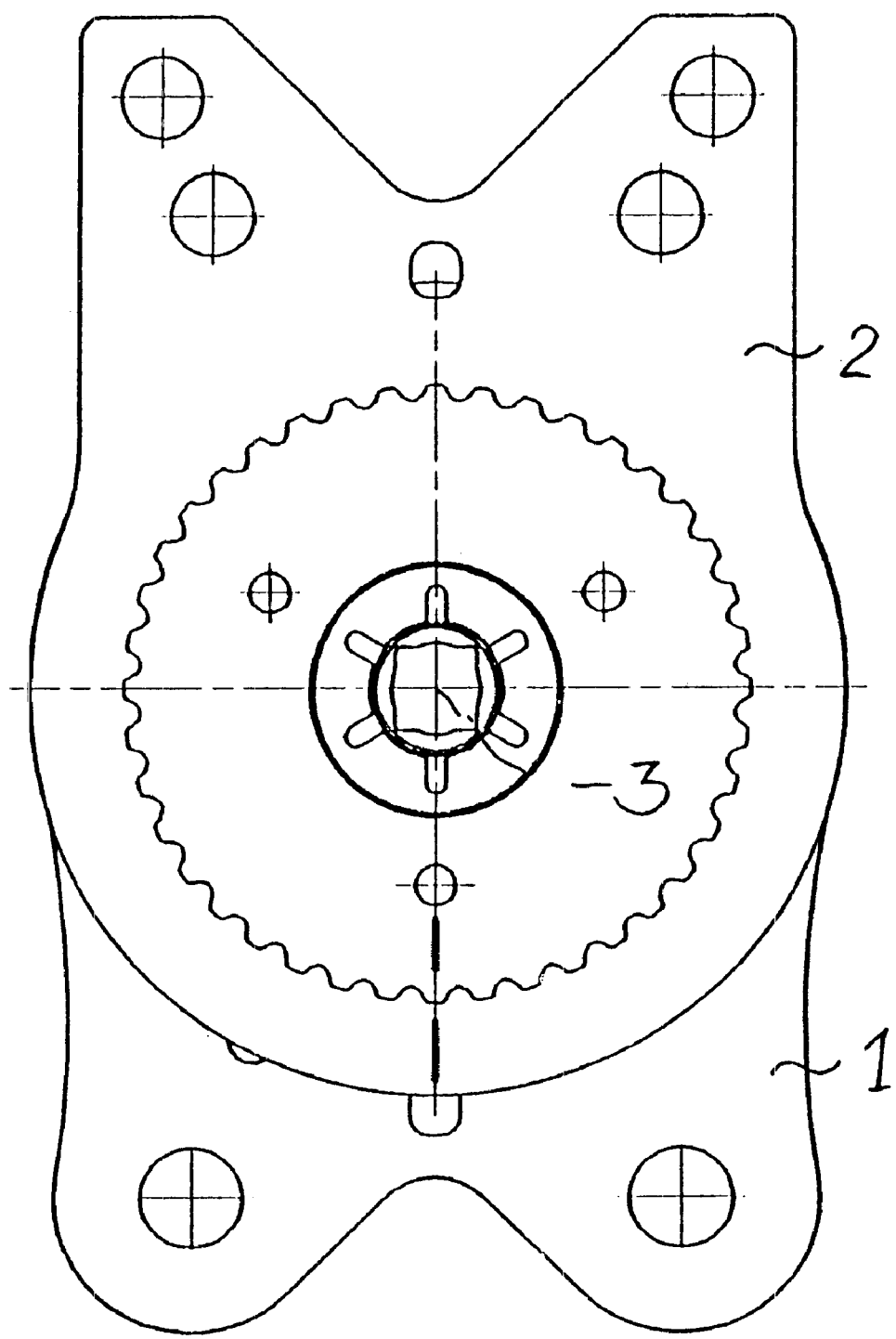
FIG. 1 is a front view of the adjustment mechanism along the rotational axis as seen from one side.
Figure 2:
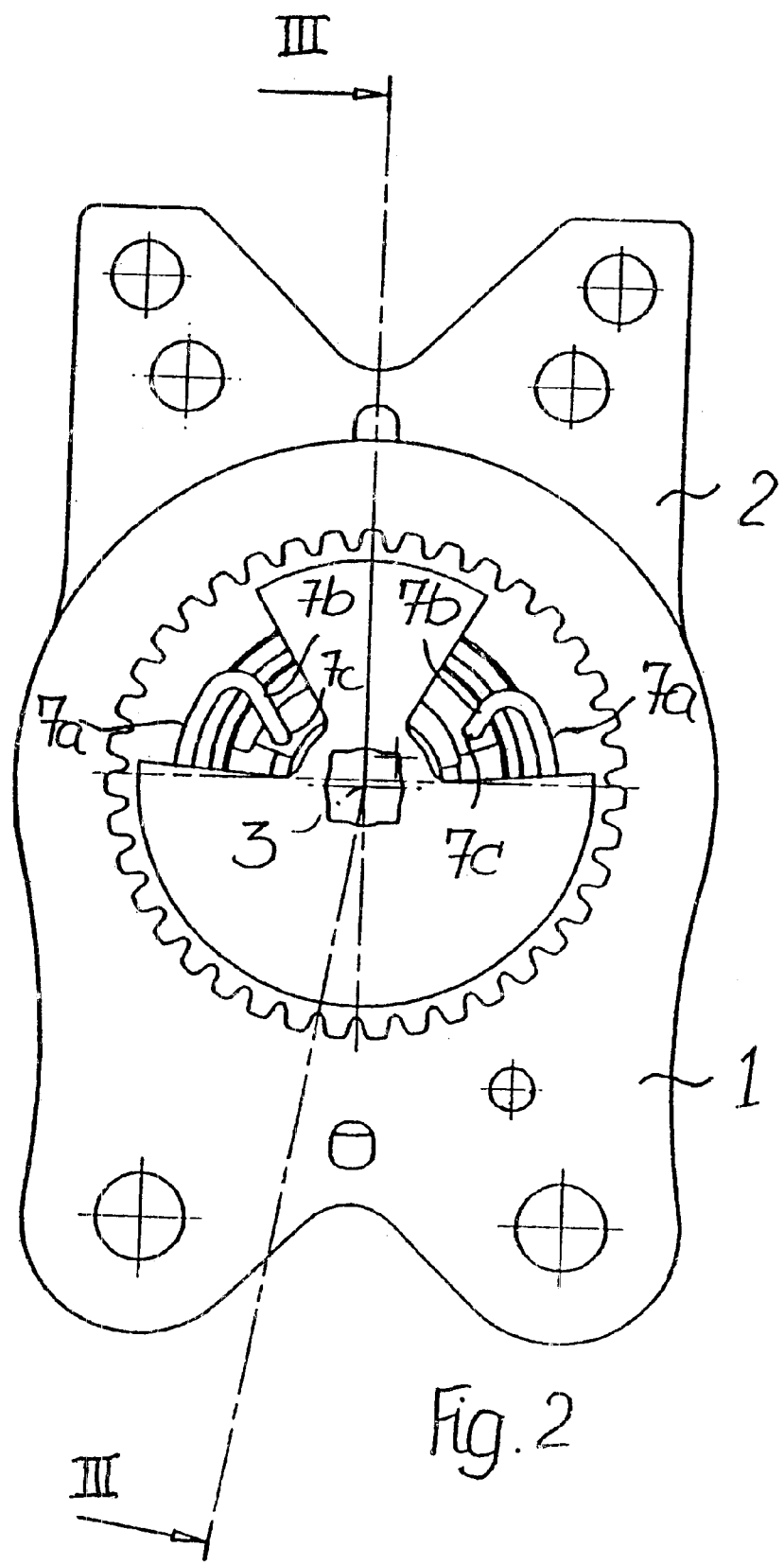
FIG. 2 is a front view of the adjustment mechanism as in FIG. 1 along the rotational axis as seen from the opposite side.
Figure 3:
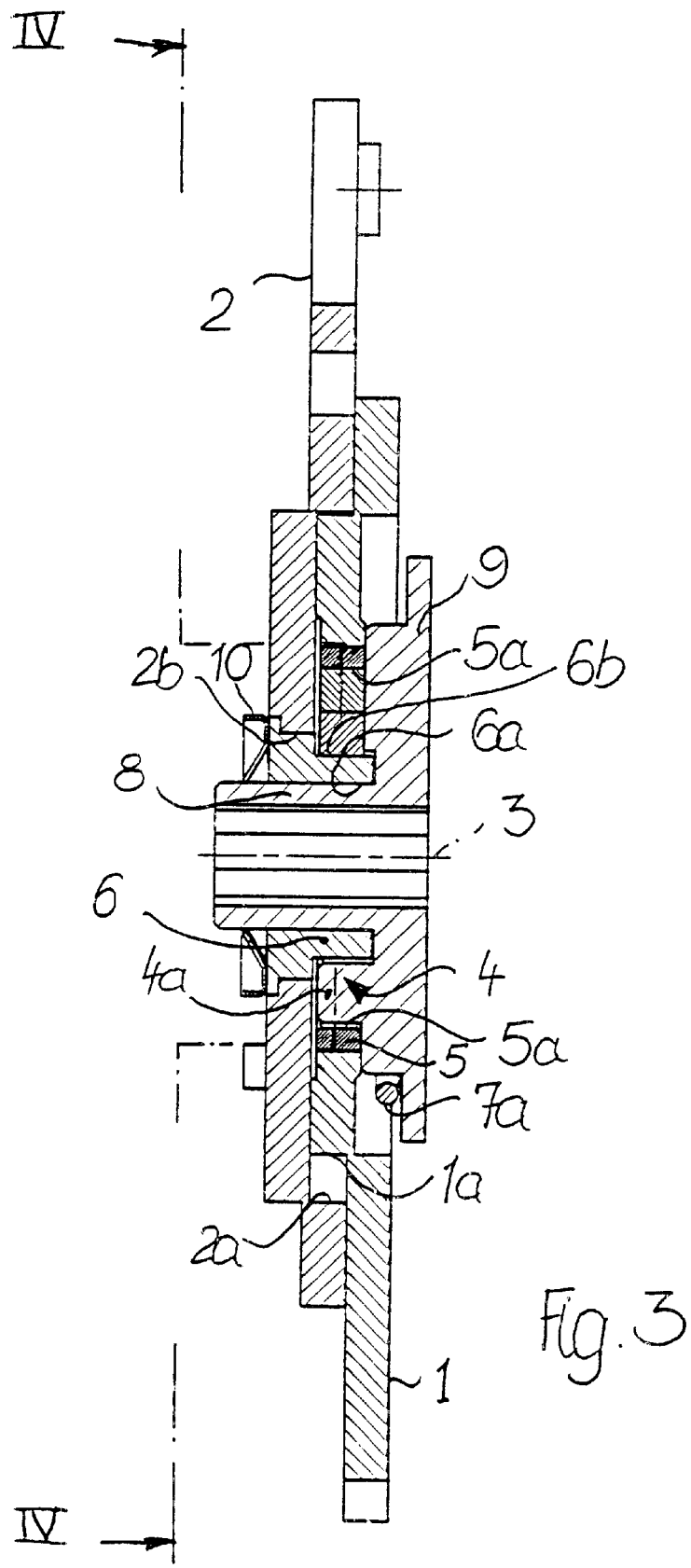
FIG. 3 is a cross-sectional view along plane III—III of FIG. 2.

The mechanism part 2 includes stepped receptor aperture 2b, FIG. 3, in which the rear portion of a bearing bushing 6 is fixed. The bearing bushing 6 forms an internal rotational bearing 6a with its inner cylindrical surface. An eccentric cam indicated overall with the numeral 4 is free to rotate around a rotational axis 3. The eccentric cam 4 includes various integrated, inter-connected areas, namely a pivot area 8 that possesses a non-round central follower aperture 8a, as well as a disc area 9 and an eccentric cam segment 4a.

The pivot area 8 is attached by means of a securing element 10 that is formed as a disc securing part with spring arms arranged radially inwards across from the bearing bushing 6 penetrated by the pivot area 8 in the direction of the rotating axis 3.

The eccentric cam segment 4a, FIG. 4, moves within an outer rotational bearing 5a that is formed by a bearing ring 5 pressed into the mechanism part 1. The eccentric cam segment 4a grips the exterior of the bearing bushing 6 as shown in FIG. 3 with its interior surface. It is advantageous if the surfaces of the eccentric cam segment 4a bent inward and outward maintain a certain separation from each opposing surface.

Two wedge segments 4b and 4c complete the eccentric cam formed by eccentric cam segment 4a.

The bent wedge segments 4b and 4c are arranged in an opposing direction. Their narrower contact surfaces 4g or 4h are positioned in the direction of the surrounding parts next to the adjacent wider contact surfaces of the wedge segments 4b or 4c. direction opposite of the wider contact surfaces of the other wedge segments A bent spring 7 includes an area 7a, FIG. 3, bent into a circle that grips around the rotational axis 3. The area 7a bent into a circle extends in a direction parallel to the rotational plane of the eccentric cam 4. The areas 7b bent inwards to which the end areas 7c bent at a right angle are connected to this area. The one end area 7c fits into the receptor hole 4i of the wedge segment 4b, and the other end area bent at a right angle fits into the receptor hole 4k of the other wedge segment 4c.

The spring 7 is so pre-stressed that it is forced to reduce the separation between the two receptor holes 4i and 4k. Because of this and of the wedge shape of the wedge segments 4b and 4c, these wedge segments are spread apart between the support area of the outer rotational bearing 5a and the circular cylindrical exterior area 6b of the right area of the bearing bushing 6 in FIG. 3.

The eccentric cam segment 4a possesses two contact surfaces 4e and 4f. When the eccentric cam 4, and thereby the eccentric cam segment 4a according to FIG. 4, rotate clockwise, the striking surface 4e comes in contact with the projected contact surface 4g of the wedge segment 4c that is carried along against the force of the spring 7 in a clockwise direction. This causes the grip of the sides of the toothed areas 1a and 2a on the side of the highest point of the eccentric cam to loosen. The tension that prevents rattling of the mechanism while it is not engaged is thereby released during rotation.

A counter-clockwise rotational direction of the eccentric cam 4 and thereby the eccentric segment 4a according to FIG. 4, likewise leads to contact by the striking surface 4f onto the contact surface 4h and to a dislocation of the wedge segment 4b in the same rotational direction. Also, the pre-tension of the toothed areas 1a and 2a at the highest point of the eccentric cam is reduced, allowing a non-tensioned clockwise rotation of the adjustment mechanism.

As soon as the rotation is ended and the parts have come to rest, the right-angled ends of the spring 7 pull the wedge segments 4b and 4c apart again, thereby increasing the eccentricity, with the result that the toothed areas 1a and 2a lying radially and engaging each other through the highest point of the eccentric cam in a plane are again pressed together.

In the embodiment of the invention shown, the inner diameter of the wedge segment 4b rests with its entire length on the outer diameter of the bearing bushing 6. It is now possible to reduce the application area of the wedge segment 4b on the exterior surrounding surface 6b in this manner so that one may provide a recess (not shown) between the two application surfaces neighboring the contact sides. The support of the wedge segment 4b at its end area prevents damage through tilting of this wedge segment in any case.

Adjustment mechanisms that operate according to the principle of a staggered transmission are known. For this type of transmission to which the adjusting mechanism based on the invention belongs, an eccentric cam or an eccentric surrounding area rotates across from the rotational axis 3. The eccentric 4 capable of being rotated and driven is supported by the exterior rotational bearing 5a in one mechanism part 1 and by the eccentric interior rotational bearing 6a in the other mechanism part 2 opposite the exterior rotational bearing 5a.

The toothed areas 1a or 2a are formed integrally with mechanism parts 1 and 2, usually made of a metal sheet using a fine-cutting procedure. The two-toothed areas 1a and 2a have different quantities of teeth and different diameters. The toothed area 1a has a smaller diameter and a smaller quantity of teeth than the toothed area 2a. Rotation of the eccentric cam causes a horizontal swiveling of the mechanism part 2 about the rotational axis 3 with respect to the mechanism part 1. The eccentric cam 4 ensures that both toothed areas 1a and 2a match each other in the area that is radial to the position of the highest point of the eccentric cam. In the other areas, the teeth of both intermeshing toothed areas are more or less positioned far apart.

Modifications and substitutions by one of ordinary skill in the art are considered to be within the scope of the present invention, which is not to be limited except by the claims that follow.

What is claimed is:

1. An incline adjustment mechanism for a seat in which a fixed mechanism part is positioned to a fixed seat area and a mechanism part that may be adjusted by rotation and is attached to a movable seat area by means of an eccentric cam that is adapted to be rotated about, and is connected by, an axis, whereby the eccentric cam is supported by an outer rotational bearing in one mechanism part and by an eccentric inner rotational bearing in the other mechanism part opposing the outer rotational bearing, and wherein both mechanism parts include toothed area portions forming a staggered transmission that are engaged with each other radially to the position of the highest point of the eccentric cam, whereby the eccentric cam area supported by the outer rotational bearing is formed by an integrated eccentric segment with the eccentric cam, and wherein the eccentric segment surrounds inner and outer wedge segments that are under tension from a spring and are pre-tensioned radially outward by the spring to form an enlarged eccentric area when the eccentric cam is not in actuation, and form a smaller eccentric area when the eccentric cam is in actuation, whereby the eccentric segment is formed with striking areas from an inner diameter oriented facing outwards to rest on contact areas of the inner and outer wedge segments when the eccentric cam is rotated, the adjustment mechanism comprising:

said inner and outer wedge segments each having a thicker and a narrower contact surface, said inner and outer wedge segments arranged one above the other radially and wherein each said narrower contact surface of each wedge segment projects above a wider contact surface of the other wedge segment in the direction of first and second opposing contact surfaces of the eccentric cam, and wherein the inner wedge segment may be rotated about an inner circular ring bearing surface and the outer wedge segment may be rotated about the bearing surface of the outer eccentric rotational bearing.

2. The adjustment mechanism according to claim 1, wherein the spring is a leg spring that includes a portion bent into a circle that extends in a direction parallel to the rotational plane of the eccentric cam, the spring having first and second end areas bent inwards and at a right angle to the rotation axis that fit into first and second receptor holes located in said inner and outer wedge segments respectively.

3. The adjustment mechanism according to claim 1, wherein the eccentric segment is formed integrally with a pivot area that may rotate within the inner rotational bearing.

4. The adjustment mechanism according to claim 1, wherein a non-round central follower aperture is disposed about said axis.

5. The adjustment mechanism according to claim 1, wherein the inner rotational bearing is formed by an inner hole of a bearing bushing that is attached for a portion of its length in a receptor aperture of an adjustment piece, and that the outer side forms a cylindrical bearing area for the inner wedge segment.

6. The adjustment mechanism according to claim 1, wherein the eccentric segment, the axis, and a sliding area arranged adjacent to the eccentric segment and extending perpendicular to the axis are integrated into one piece.

7. The adjustment mechanism according to claim 1, wherein the axis fitting into the inner rotational bearing is attached by means of a securing element opposite from a bearing bushing penetrating the axis in the direction of the rotational axis.

8. The adjustment mechanism according to claim 1, wherein the outer rotational bearing is formed by an outer bearing ring firmly attached to said mechanism.

* * * * *